United States Patent Office 3,684,510
Patented Aug. 15, 1972

3,684,510
LIGHT SENSITIVE MATERIAL COMPRISING INDOLYLMETHANE DERIVATIVES AND TETRABROMOMETHANE
Hubertus Psaar, Walter Puschel, and Roderich Raue, Leverkusen, Germany, assignors to Agfa-Gevaert Aktiengesellschaft, Leverkusen, Germany
No Drawing. Filed Aug. 21, 1970, Ser. No. 66,119
Claims priority, application Germany, Sept. 11, 1969, P 19 58 709.8
Int. Cl. G03c 1/72, 5/24
U.S. Cl. 96—48 R
8 Claims

ABSTRACT OF THE DISCLOSURE

A mixture of (1) an indolyl methane compound of the formula

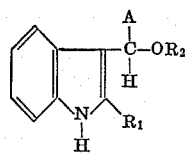

in which

A is aryl or a heterocyclic aromatic group and
$R_1$ and $R_2$ are H, alkyl or aralkyl, (2) an aryl amino compound and (3) a tetrahalomethane compound can be used for the production of copies.

---

The invention relates to a light sensitive material for the production of copies from an original, which material contains compounds which react under the influence of light in the presence of activators to yield indolyl-diarylmethane dyes. Numerous photographic processes are known in which light sensitive organic compounds are used for the recording of images. These processes are generally based on photochemical transpositions or reactions of organic compounds which are accompanied by the production of color or by color changes. A summary of such photochemical reactions of organic compounds is available, for example, under the title "Präparative organische Fotochemie" (Springer-Verlag, 1958). Especially worthy of mention are the disproportionation reaction of colorless tetrazolium salts which occurs under the influence of irradiation with UV light with the formation of colored formazanes, the internal molecular rearrangement of certain aromatic orthonitro compounds which takes place under the influence of irradiation with UV light with the formation of colored isatogens, or the rearrangement of non-coupling stable diazo sulfonates with the formation of diazo sulfonates which undergo labile coupling reactions and which react with suitable coupling components under alkaline conditions to yield azo dyes. The latter have found wide use in so-called diazo type processes.

It is also known that such photochemical reactions can occasionally be catalyzed by the addition of certain activators. In this connection there may be mentioned, for example, the process which is based on the rearrangement of colorless triphenyl acetonitriles into colored triphenylmethane dye salts which occurs with absorption of light energy in the presence of suitable catalysts. Furthermore, there is the well known fact that the oxidation of certain leuco compounds induced by the action of light can be catalyzed by the addition of activators. Some of these known effects have already been used in reproduction techniques. Thus, for example, light sensitive materials for the production of negatives are known which contain the leuco form of a triphenylmethane dye and suitable activators in the light sensitive layer. The following are mentioned as examples of activators:

Ketones, aldehydes, esters or certain sulfur compounds.

High energy, very short wave light and even ultraviolet light is generally required in the above mentioned processes for the production of images. Even under the influence of UV light most of the known materials are still fairly insensitive, so that long exposure times and high light intensities are necessary.

It is, therefore, an object of the invention to produce a copying material which has improved light sensitivity.

A light sensitive material has now been found which is characterized in that it contains an indolyl methane compound which is capable of condensation, an aryl amino compound and a tetrahalomethane compound as activator. The invention is based on the well known condensation reaction indicated in the following reaction scheme in which an indolyl-diarylmethane dye is produced:

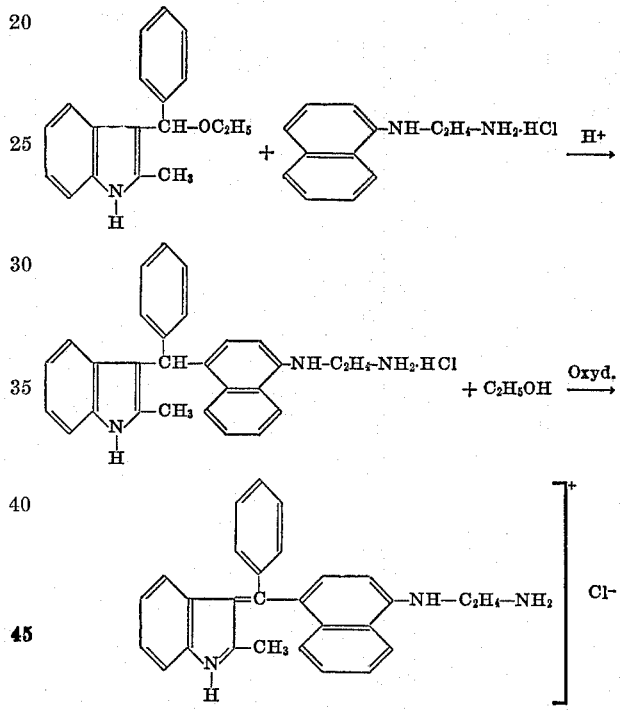

This reaction generally requires elevated temperature.

It has now been found that this reaction will also occur at room temperature if, for example, a mixture of 2-methylindolyl-(3) - phenylethoxymethane and a mineral acid salt of an aryl amino compound is exposed to the influence of light in the presence of a tetrahalomethane compound. The indolyl methane compound capable of condensation which is used in the light sensitive material according to the invention corresponds to the following general formula:

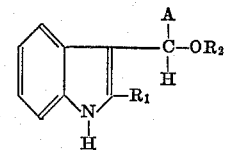

in which

A=an aryl group, especially a phenyl group, which may carry further substituents such as an alkyl or alkoxy group, a halogen atom such as chlorine or bromine, or a nitro group or a heterocyclic aromatic group such as thienyl or furyl, $R_1$ = a hydrogen atom, an alkyl group containing preferably up to 4 C-atoms such as a methyl, alkyl, propyl or butyl group, or an aralkyl group, for example a benzyl group, and $R_2$ = a hydrogen atom, an alkyl group, preferably containing up to 4 C-atoms such as a methyl, ethyl, propyl or butyl group, or an aralkyl group such as a benzyl group.

The following are examples of indolyl methane compounds which have proved to be suitable:

1 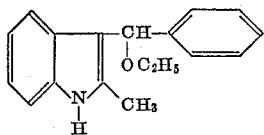

2 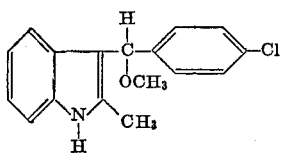

3 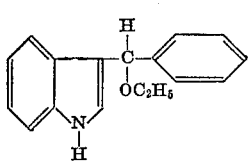

4 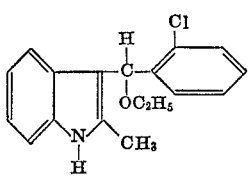

5 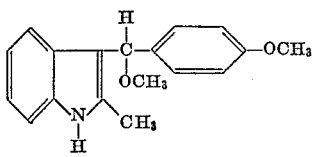

6 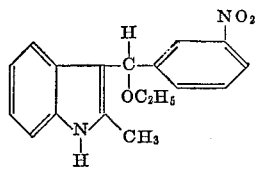

7 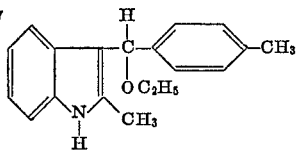  8 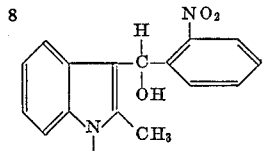

9 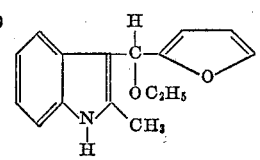  10 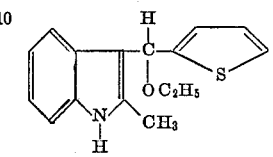

Indolylmethane compounds are known. Their preparation has been described in the publication by M. Scholz, Ber. dtsch. chem. Ges. 46, 2138 (1913). The preparation of compound No. 10 will now be described by way of example: 26 parts of 2-methylindole and 22.5 parts of thiophene-2-aldehyde in 100 parts of 96% ethyl alcohol and 20 parts of 10% sodium hydroxide solution are stirred for 24 hours at from 20 to 30° C. Water is added until crystallization sets in, and the precipitate is removed by suction filtration after a further 10 hours. The product is recrystallized from alcohol. M.P. 127–128° C.

The aryl amino compounds used in the material according to the invention are primary, secondary or tertiary aromatic amino compounds, for example anilines or amino naphthalenes, which may contain one or two substituents on the nitrogen atom. The additional substituents on the amino group may be alkyl groups or aryl groups. An essential condition which the amino compounds must fulfill if they are to be usable for this purpose is that at least one of the ortho- or para-positions present must be free from substituents. The following are examples of suitable amino compounds:

1-aminonaphthalene,
1-ethylaminonaphthalene,
1-dimethylaminonaphthalene,
1,3-aminoethylaminonaphthalene,
diphenylamine,
N-methyldiphenylamine and
4-ethoxy-N-methyldiphenylamine.

Instead of the amino compounds, other coupling components conventionally used in azo chemistry may be used, e.g. indoles. The activator used is a tetrahalomethane compound, e.g. tetrabromomethane.

The process according to the invention consists in that an image recording material which contains indolyl methane compounds, amino compounds which are capable of coupling, and a tetrahalomethane compound as activator, is exposed imagewise. On exposure, the dye which has red, blue or violet color, is produced in the exposed areas. In order to protect the resulting images against discoloration on further exposure, they are fixed in the dark or under weak illumination by treating them with a liquid which dissolves the activator and optionally one or both coupling components from the layer.

For the production of the copying material according to the invention, a solution which contains both one or more of the above mentioned indolyl methane compounds and one or more aromatic amino compounds which are capable of coupling and an activator is prepared, the solution is applied in a suitable manner on a support layer and the solvent is evaporated, all these procedures being performed in the dark. Suitable solvents are mainly those which are miscible with water, e.g. acetone, methanol or dimethylformamide. The components must, of course, be sufficiently soluble in the solvent. The solutions may also contain small quantities of natural or synthetic binders of the type normally used in photographic materials, e.g. gelatin, cellulose derivatives, N-propylvinyl pyrrolidone, polyvinyl alcohol or the various film-forming polymers or copolymers of olefinically unsaturated monomers such as vinyl chloride, vinyl acetate and styrene. When such binders are used, it may be necessary for the solvent to contain water insoluble constituents such as chloroform, benzene, toluene etc.

The reactants and the activator may, of course, be applied to the support layer one after the other from separate solutions, but considerable simplification is achieved if both reactants and the activator are applied to the support from a common solution. The concentration of the reactants is advantageously kept within the range of from 1 to 20% by weight, based on the solvent. The reactants, i.e. the indolyl methane compound and the amino compound which is capable of coupling, are generally used in the molar ratio of 1:1 but it may, in some cases, be necessary to use one or other retactant in excess. The molar ratio of the reactants may accordingly be varied, for example within the region of from 1:4 to 4:1. The activator which, on exposure, yields the oxidizing agent in imagewise distribution but does not itself take part in the reaction, is generally only required in catalytic amounts, but in order to achieve sufficiently high sensitivity it is, in many cases, desirable to use larger quantities of activator, so that the quantity of activator used in practice may vary, for example, between 1 and 30 mols percent based on the light sensitive mixture which is free from solvent.

All the support materials normally used in reproduction technique may be used as supports for the light sensitive layer. Paper is generally preferred. The paper may be slightly absorbent to ensure thorough and uniform adsorption of the substances in the paper.

Application of the solution to the support layer may be carried out in a known manner, for example the light sensitive mixture may be applied to the support by spraying, immersion or roller application.

A high energy source of light is advantageously used for exposure especially sources of light which contain a high proportion of ultraviolet radiation. Direct daylight, sunlight, mercury vapour lamps and electronic flash lamps, for example, are suitable for this purpose.

It is found to be especially advantageous that in the process according to the invention exposure may also be carried out using conventional incandescent lamps.

The material according to the invention is, of course, also suitable for the recording of electron beams.

On exposure, the indolylarylmethane dye is produced by an oxidative condensation reaction with the aid of the activator.

To stabilize the images obtained, i.e. to prevent subsequent discolouration of unreacted light sensitive mixture, the images are fixed by treating them with solvent, thus removing the activator and possibly one or both reactants. This may be carried out e.g. by bathing the images in a suitable solvent. Substantially the same solvents are suitable for this purpose as those used for the production of the light sensitive material, e.g. acetone, methanol and dimethylformamide, but also for example ethyl acetate. However, it is to be understood that the solevnts used for this purpose, must not dissolve the indolyl-diaryl-methane dyes formed at the light-struck parts of the image. According to another method of carrying out the process, the images are fixed by rubbing them with a sponge or wad of cotton wool steeped with solvent, and are then dried.

The images obtained with the material according to the invention may also be stabilized by a short heat treatment, e.g. in a drying cupboard adjusted to from 70 to 120° C. by infra-red radiation or by passing them over hot rollers. It is advantageous if the heat treatment is carried out under reduced pressure. This causes the activator to be distilled out of the layer and a material which is not sensitive to light remains behind.

EXAMPLE 5 g. of Compound 1 and 5 g. of the amine of the following formula:

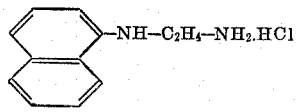

and 1 g. of tetrabromomethane are dissolved in 100 ml. of alcohol. Absorbent office paper is steeped in this solution and then dried by blowing warm air on it. The copying material produced in this way is then exposed behind an original, various sources of light being used:

(1) Exposure with an electronic flash at a distance of 10 cm.; after a single exposure a clear copy of the original is obtained.

(2) Exposure with a UV lamp of the type conventionally used in chemical laboratories as analytical quartz lamp. Distance 10 cm. A copy of the original is obtained after 2 minute's exposure.

(3) Exposure with a high pressure xenon lamp. Distance 10 cm. Copy of the original is obtained after 1 minute's exposure.

The images were fixed by bathing the exposed material in ethyl acetate for 2 minutes. They were then dried by blowing warm air on them.

What we claim is:

1. A light sensitive photographic material which contains:
   (a) an indolymethane compound of the formula

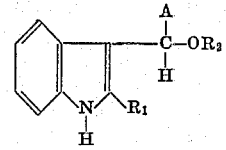

in which
   A is aryl or a heterocyclic aromatic group selected from the group consisting of thienyl and furyl;
   $R_1$ is hydrogen or alkyl with up to 4 C atoms, and
   $R_2$ is hydrogen or alkyl with up to 4 C atoms,
   (b) an arylamino compound in a coupling amount selected from the group consisting of anilines aminoaphthalenes having at least one of the positions ortho and para to the amino group free from substituents, and
   (c) tetrabromomethane.

2. A process for the production of copies which comprises the imagewise exposure of a light sensitive photographic material as claimed in claim 1 and fixing by heat treatment or by treatment with a solvent in which the tetrabromomethane activator and/or either or both the indolyl methane compound and the aryl amino compound capable of coupling, are soluble.

3. A process for the production of a photographic material as claimed in claim 1 in which one or more indolyl methane compounds, one or more aryl amino compounds which are capable of coupling, and the tetrabromomethan activator are used in the form of a solution, which solution is applied to a support layer, and the solvent is evaporated.

4. A process as claimed in claim 3 in which the solutions contain natural or synthetic binders.

5. A process as claimed in claim 3 in which the concentration of the reactants is within the range of from 1 to 20% by weight, based on the solvent.

6. A process as claimed in claim 3 in which the indolyl methane compound and the aryl amino compound which is capable of coupling are used in the molar ratio of 1:4 to 4:1.

7. A process as claimed in claim 3 in which the quantity of tetrabromomethane activator used is between 1 and 30 mols percent based on the light sensitive mixture which is free from solvent.

8. A process as claimed in claim 3 in which the support material is paper.

References Cited

UNITED STATES PATENTS 3,527,517    9/1970    Hackmann _____ 96—90
3,164,467    1/1965    Sprague et al. _____ 96—90

NORMAN G. TORCHIN, Primary Examiner

R. E. FICHTER, Assistant Examiner

U.S. Cl. X.R.

96—90 R